United States Patent [19]

Schmidt et al.

[11] Patent Number: 5,719,232
[45] Date of Patent: Feb. 17, 1998

[54] ABS TYPE THERMOPLASTIC MOULDING COMPOUNDS

[75] Inventors: Adolf Schmidt, Köln; Herbert Eichenauer; Ulrich Jansen, both of Dormagen, all of Germany

[73] Assignee: Bayer Aktiengesellschaft, Germany

[21] Appl. No.: 424,656

[22] Filed: Apr. 19, 1995

[30] Foreign Application Priority Data

Apr. 22, 1994 [DE] Germany ............. 44 14 123.8

[51] Int. Cl.$^6$ ................................. C08L 55/02
[52] U.S. Cl. ................. 525/86; 525/71; 525/73; 525/76; 525/80; 525/83; 525/84; 525/316; 525/902; 524/504
[58] Field of Search ................... 525/71, 73, 80, 525/316, 84, 86, 87, 83, 902; 524/505, 504

[56] References Cited

U.S. PATENT DOCUMENTS

| | | | |
|---|---|---|---|
| 4,009,226 | 2/1977 | Ott et al. | 525/71 |
| 4,009,227 | 2/1977 | Ott et al. | 525/71 |
| 4,520,165 | 5/1985 | Zabrocki et al. | 525/84 |
| 4,767,833 | 8/1988 | Yomoto et al. | 525/193 |
| 4,885,337 | 12/1989 | Eichenauer et al. | 525/75 |
| 5,186,993 | 2/1993 | Hallden-Abberton et al. | 428/36.92 |

FOREIGN PATENT DOCUMENTS

| | | |
|---|---|---|
| 253236 | 1/1988 | European Pat. Off. . |
| 24 20 357 | 12/1975 | Germany . |
| 24 20 358 | 12/1975 | Germany . |

OTHER PUBLICATIONS

Derwent Database, AN 74-25603V (1973).

*Primary Examiner*—Mark L. Warzel
*Attorney, Agent, or Firm*—Connolly & Hutz

[57] ABSTRACT

ABS type thermoplastic moulding compounds obtainable by

A) producing a rubber latex with an average particle diameter $d_{50}$ of 30 to 160 nm and a gel content of 75 to 100 wt. %

B) emulsion polymerization of an amount of butadiene and optionally up to 50 wt. % (with reference to the total amount of monomer in stage B) of a comonomer in the presence of the rubber obtained in stage A, such that a rubber latex (B) with an average particle diameter $d_{50}$=220 to 330 nm and a gel content of 25 to 70 wt. % is produced, C) emulsion polymerization of 40 to 95 parts by wt. of a mixture of styrene and acrylonitrile, which optionally contains up to 50 wt. % (with reference to the total amount of monomers used in stage C) of one or more comonomers, in the presence of 5 to 60 parts by wt. (with reference to the solids) of the rubber obtained in stage B by introducing the monomer in such a way that 55 to 90 wt. % of the monomers are added within the first half of the total monomer introduction time, and D) mixing the polymer obtained in stage C, preferably after first converting it into a powder, with at least one thermoplastic vinyl resin.

5 Claims, No Drawings

ABS TYPE THERMOPLASTIC MOULDING COMPOUNDS

The invention relates to ABS type moulding compounds with improved properties as compared with known ABS moulding compounds, in particular a combination of very high strength and very high surface gloss.

ABS moulding compounds are two-phase plastics consisting of 1. a thermoplastic copolymer of styrene and acrylonitrile, in which the styrene may be replaced entirely or partly by α-methylstyrene or methylmethacrylate; this copolymer, also called SAN resin or matrix resin, forms the external phase;

and 2. at least one graft polymer, which has been prepared by the graft reaction of one or several of the monomers mentioned under 1 on a butadiene homopolymer or copolymer ("graft substrate"). This graft polymer ("elastomer phase" or "graft rubber") forms the disperse phase in the matrix resin.

A key property of ABS moulding compounds is their very high impact resistance, which is why these materials are used for preference in areas of application with high mechanical strain.

It is known that, to produce high strengths during the production of ABS moulding compounds, rubber particles with the largest possible diameters have to be used.

The use of this type of tough material can cause problems, however, if a high surface gloss is also required for the moulded item produced from the ABS polymer (cf. F. Lednicky and Z. Pelzbauer, Angew. Makromol. Chem. 141 (1986), 151).

Although the use of bimodal systems (combinations of graft rubbers based on coarsely and finely divided rubber particles) has been described for this purpose (see, e.g. DE-OS 24 20 357 and DE-OS 24 20 358 and the references cited there), very tough products are not produced with these systems and the proportion of coarse rubber particles in the disperse phase which is still required in order to provide strength, has a negative effect on the surface gloss, which means that high-gloss moulded items cannot be produced.

It has now been found that ABS moulding compounds which simultaneously have high values for impact strength and a high surface gloss are obtained by the sole use of relatively small specially structured rubber particles while maintaining specific proportions of the individual components and by the application of special reaction conditions when producing the graft rubber.

The invention provides ABS type thermoplastic moulding compounds which are obtainable by A) producing a rubber latex with an average particle diameter $d_{50}$ of 30 to 160 nm, preferably of 50 to 150 nm and in particular 80 to 140 nm, and a gel content of 75 to 100 wt. %, preferably 80 to 95 wt. % and in particular 85 to 95 wt. %, by emulsion polymerisation of butadiene and optionally up to 50 wt. % (with reference to the total amount of monomer in stage A) of a comonomer, B) emulsion polymerisation of an amount of butadiene and optionally up to 50 wt. % (with reference to the total amount of monomer in stage B) of a comonomer in the presence of the rubber latex obtained in stage A, such that a rubber latex (B) with an average particle diameter $d_{50}$=220 to 330 nm, preferably 230 to 320 nm and in particular 250 to 310 nm, and a gel content of 25 to 70 wt. %, preferably 30 to 65 wt. % and in particular 35 to 60 wt. %, is produced, C) emulsion polymerisation of 40 to 95 parts by wt., preferably 50 to 90 parts by wt. and in particular 55 to 80 parts by wt. of a mixture of styrene and acrylonitrile, which optionally contains up to 50 wt. % (with reference to the total amount of monomers used in stage C) of one or more comonomers, in the presence of 5 to 60 parts by wt., preferably 10 to 50 parts by wt. and in particular 20 to 45 parts by wt. (each with reference to the solids) of the rubber latex obtained in stage B by introducing the monomer in such a way that 55 to 90 wt. %, preferably 60 to 80 wt. % and in particular 65 to 75 wt. % of the monomers are added within the first half of the monomer introduction time, and D) mixing the polymer obtained in stage C, preferably after first converting it into a powder, with at least one thermoplastic vinyl resin, preferably a styrene/ acrylonitrile copolymer.

The first rubber latex (stage A) can be produced by emulsion polymerisation of butadiene. This polymerisation is known and is described, for example, in Houben-Weyl, Methoden der Organischen Chemie, Makromolekulare Stoffe, part 1, p. 674 (1961), Thieme Verlag Stuttgart. Up to 50 wt. % (with reference to the total amount of monomer used in stage A) of one or more monomers which can be copolymerised with butadiene may the used as comonomers. Examples of such monomers are isoprene, chloroprene, acrylonitrile, styrene, α-methylstyrene, $C_1$-$C_4$-alkylstyrenes, $C_1$-$C_8$-alkylacrylates, $C_1$-$C_8$-alkylmethacrylates, alkylene glycol acrylates, alkylene glycol dimethacrylates, divinylbenzene; butadiene is preferably used on its own.

The rubber latex produced in stage A has an average particle diameter $d_{50}$ (determined by measurement in an ultracentrifuge, see W. Scholtan, H. Lange: Kolloid-Z. u. Z. Polymere 250, pp. 782 to 792 (1972)) of 30 to 160 nm, preferably 50 to 150 nm and in particular 80 to 140 nm, and a gel content (determined by the wire cage method in toluene, see Houben-Weyl, Methoden der Organischen Chemie, Makromolekulare Stoffe, part 1, p. 307 (1961), Thieme Verlag Stuttgart) of 75 to 100 wt. %, preferably 80 to 95 wt. % and in particular 85 to 95 wt. %.

The rubber latex in stage B can be produced by polymerising butadiene in the presence of the latex obtained in stage A. Using this so-called seed latex polymerisation (see Houben-Weyl, Methoden der Organischen Chemie, Makromolekulare Stoffe, part 1, p. 339 (1961), Thieme Verlag Stuttgart), large particled latices are obtained.

For this, an amount of butadiene and optionally up to 50 wt. % (with reference to the total amount of monomers used in stage B) of one or more comonomers (e.g. the monomers mentioned as examples in stage A) is polymerised in the presence of the rubber latex from stage A, until a latex with an average particle diameter $d_{50}$ of 220 to 30 nm, preferably 230 to 320 nm and in particular 250 to 10 nm and a gel content of 25 to 70 wt. %, preferably 30 to 65 wt. % and in particular 35 to 60 wt. % has been produced.

Rubber latex B preferably has a narrow distribution of particle sizes, i.e. a width of particle size distribution (measured as $d_{90}$–$d_{10}$ from the integral particle size distribution) $\leq 120$ nm, preferably $\leq 100$ nm, particularly preferably $\leq 80$ nm and in particular $\leq 60$ nm.

The gel content of the latices from stages A and B can in principle be adjusted in a known way by using appropriate reaction conditions (e.g. high reaction temperature and/or polymerisation up to a high conversion and optionally the use of cross-linking substances to produce a high gel content or e.g. low reaction temperature and/or termination of the polymerisation reaction before the occurrence of too great an extent of cross-linking and optionally the addition of molecular weight regulators such as for example n-dodecylmercaptan or t-dodecylmercapatan to produce a low gel content).

Emulsifiers which may be used are conventional anionic emulsifiers such as alkyl sulphates, alkyl sulphonates, aralkyl sulphonates, soaps of saturated or unsaturated fatty acids and alkaline disproportionated or hydrogenated abietic or tall oil acids, emulsifiers with carboxyl groups (e.g. salts of $C_{10}$–$C_{18}$ fatty acids, disproportionated abietic acid) are preferably used. Emulsifiers which are particularly preferred (especially for production of the rubber latex in stage B) are those which do not lead to the formation of new particles during seed polymerisation, e.g. compounds of the formula (I)

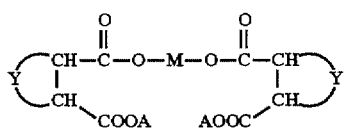

where

M=

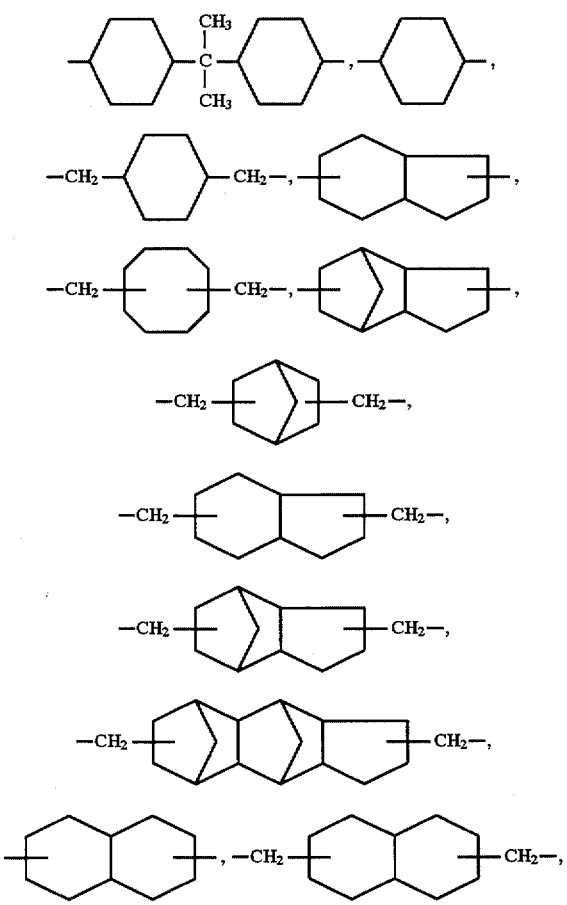

Y=

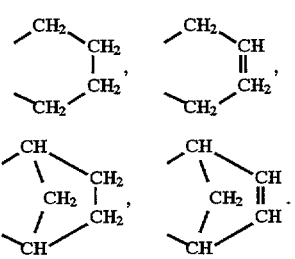

A=an alkali metal or ammonium.

This type of emulsifier is known (see, e.g. DE-OS 39 19 548 and DE-OS 39 25 634).

The graft polymerisation in stage C may be performed in such a way that the monomer mixture is continuously added to the rubber latex from stage B and polymerised.

In this case a specific monomer:rubber ratio and a specific procedure for adding the monomer to the rubber latex must be observed.

To produce the products according to the invention in stage C, 40 to 95 parts by wt., preferably 50 to 90 parts by wt. and in particular 55 to 80 parts by wt. of a mixture of styrene and acrylonitrile, which can optionally contain up to 50 wt. % (with reference to the total amount of monomers used in stage C) of one or more comonomers, are polymerised in the presence of 5 to 60 parts by wt., preferably 10 to 50 parts by wt. and in particular 20 to 45 parts by wt. (each with reference to solids) of the rubber obtained in stage B.

The monomers used in this graft polymerisation are preferably mixtures of styrene and acrylonitrile in the ratio by weight of 90:10 to 50:50, in particular in the ratio by weight of 65:35 to 75:25, wherein styrene or acrylonitrile may be partly replaced by copolymerisable monomers, preferably by α-methylstyrene, methylmethacrylate or N-phenylmaleic imide.

In addition, molecular weight regulators may be used during graft polymerisation (C), preferably in amounts of 0.05 to 2 wt. %, in particular in amounts of 0.1 to 1 wt. % (each with reference to the total amount of monomers in stage C).

Suitable molecular weight regulators are, for example, n-dodecylmercaptan, t-dodecylmercaptan,, dimeric α-methylstyrene.

Suitable initiators are inorganic and organic peroxides, e.g. $H_2O_2$, di-tert.butyl peroxide, cumene hydroperoxide, dicyclohexyl percarbonate, tert.butyl hydroperoxide, p-menthane hydroperoxide, azo initiators such as e.g. azo-bis-isobutyronitrile, inorganic persalts such as ammonium, sodium or potassium persulphate, potassium perphosphate, sodium perborate and redox systems, which are generally composed of an organic oxidising agent and a reducing agent, wherein heavy metal ions are also present in the reaction medium (see H. Logemann in Houben-Weyl, Methoden der Organischen Chemie, vol. 14/1, pp. 263 to 297).

The reaction temperature is 25° C. to 160° C., preferably 40° C. to 90° C. The compounds mentioned above may be used as emulsifiers.

To produce graft polymer (C) according to the invention, graft polymerisation must be performed by adding the monomers in such a way that 55 to 90 wt. %, preferably 60 to 80 wt. % and in particular 65 to 75 wt. % of the total monomers being used during graft polymerisation C are added within the first half of the total monomer addition time. The remaining amount of monomers is added over the second half of the total monomer addition time.

Finally, the graft polymer produced in this way is mixed with at least one thermoplastic vinyl resin.

This can be done in a variety of ways. If the vinyl resin itself was produced by emulsion polymerisation, the latices may be mixed and then precipitated and processed together.

If the vinyl resin was produced by solution or bulk polymerisation, then the graft polymer must be isolated by known methods, for example by spray-drying or by the addition of salts and/or acids, the precipitated product must be washed and the powder must be dried and then mixed with the vinyl resin (preferably by multiple roll milling, compounding extrusion or internal mixing). This method is preferably used.

Copolymers of styrene and acrylonitrile in the ratio by weight of 90:10 to 50:50 are preferably used as vinyl resins, wherein the styrene may be replaced partly or entirely by α-methylstyrene and/or methylmethacrylate. Optionally, a proportional amount of up to 30 wt. %, with reference to the vinyl resin, of other monomers from the group consisting of maleic anhydride, maleic imide, N-(cyclo)-alkylmaleic imide, N-(alkyl)-phenylmaleic imide, may also be used.

Details on the preparation of these resins are described for instance in DE-AS 24 20 358 and DE-AS 27 24 360. Vinyl resins prepared by bulk or solution polymerisation have proved particularly useful.

The proportion of graft rubber in the moulding compounds according to the invention can be varied over wide limits; it is preferably 10 to 80 wt. %, in particular 20 to 75 wt. %.

Required or expedient additives may be added to the moulding compounds according to the invention during production, processing, further processing and final moulding, e.g. antioxidants, I/V stabilisers, peroxide decomposers, antistatic agents, lubricants, mould release agents, flameproofing agents, fillers or reinforcing agents (glass fibres, carbon fibres, etc.) or colorants.

Final moulding may be performed using commercially available processing units and includes, for instance, processing by injection moulding, sheet extrusion optionally followed by thermoforming, cold forming, extrusion of pipes and profiles or calendering.

In the following examples, the parts given are always parts by weight and the %-ages given are always wt. %, if nothing else is stated.

EXAMPLES

Example 1

Production of a rubber latex (stage A)

The following components are placed in a pressure resistant 6 l container with a vane stirrer (speed about 120 rpm):

| | |
|---|---|
| Deionised water | 2,280.00 g |
| Disproportionated abietic acid in the form of its sodium salt (Dresinate 731) as a 10 wt. % strength aqueous solution | 372.00 g |
| t-dodecylmercaptan | 4.50 g |
| Potassium peroxodisulphate in the form of a 2.5 wt. % strength aqueous solution | 150.00 g |

After evacuating the reactor and rinsing with nitrogen, 1,900.00 g of butadiene are added, and the mixture is then heated to 65° C. and polymerised until the pressure falls to 4 bar (ca. 22 hours).

The resulting polybutadiene latex has an average particle diameter $d_{50}$ of ca. 115 nm (determined by using an ultracentrifuge) and a gel content of 93 wt. %.

Preparing a rubber latex (stage B)

The following components are placed in a pressure resistant 6 l reactor with a vane stirrer (speed ca. 120 rpm):

| | |
|---|---|
| Deionised water | 1,100.00 g |
| Polybutadiene from stage A | 175.40 g |

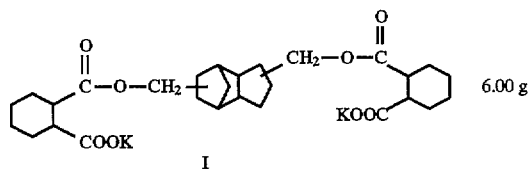

6.00 g

After evacuating the reactor and rinsing with nitrogen, the following are added:

| | |
|---|---|
| butadiene | 480.00 g |
| t-dodecylmercaptan/n-dodecylmercaptan in a 1:1 mixture | 2.16 g |

Then the mixture is heated to 65° C. and a solution of

| | |
|---|---|
| deionised water | 48.00 g |
| potassium peroxodisulphate | 4.80 g | is added. Then in parallel and over the course of 20 hours, 1,677.00 g of butadiene, and 12,02 g of a t-dodecylmercaptan/n-dodecylmercaptan=1:1 mixture and a solution of 24.00 g of I in 726.00 g of deionised water are added. After a further reaction period (44 h) at 65° C., the pressure is released when it has reached 4 bar. This results in a polybutadiene latex with an average particle diameter $d_{50}$ of 276 nm and a gel content of 49 wt. %.

Graft polymerisation onto the polybutadiene latex (stage C)

72.20 parts by wt. of the approximately 48.5 wt. % strength polybutadiene latex from stage B, after degassing, are placed in a reactor and adjusted to a solids content of about 20 wt. % by adding deionised water, 0.5 parts by wt. of $K_2S_2O_8$ are added in the form of a 2.5 wt. % strength aqueous solution and the mixture is heated to 62° C.

After this, 65 parts by wt. of a styrene/acrylonitrile mixture (ratio by wt. 72:28) and 0.2 parts by wt. of t-dodecylmercaptan and in parallel to this 15 parts by wt. of an aqueous 10% strength solution of the sodium salt of disproportionated abietic acid (Dresinate 731) are added over the course of 4 hours in such a way that 60 wt. % of the total amount of monomer is added to the reaction mixture in the first 2 hours. After a post reaction time of 4 hours at 62° C. there resulted a graft rubber latex with a solids content of about 36 wt. %.

Stabilising with a phenolic antioxidant, coagulating with a magnesium sulphate/acetic acid mixture, washing with water and drying under vacuum produced a graft rubber powder with a rubber content of about 35 wt. %.

Mixing the graft polymer with a vinyl resin component (stage D)

62.8 parts by wt. of the graft rubber powder from stage C are mixed in an internal mixer with 37.2 parts by wt. of a styrene/acrylonitrile copolymer resin (styrene:acrylonitrile= 72:28; $\overline{M}_w$=115 000, $\overline{M}_w/\overline{M}_n-1 \leq 2$), 0.1 parts by wt. of silicone oil and 2 parts by wt. of ethylenediamine-bis-stearylamide and then processed by injection moulding to form test specimens.

The following characteristics were determined:

Notch impact strength at room temperature ($a_k^{RT}$) and at $-40°$ C. ($a_k^{-40°\,C.}$) according to ISO 180/1A (unit: $kJ/m^2$), ball puncture resistance $H_c$ according to DIN 53 456 (unit: $N/mm^2$), heat distortion temperature (Vicar B) according to DIN 53 460 (unit: °C.), flow behaviour MVI according to DIN 53 735 U (unit: $cm^3/10$ min) and gloss behaviour according to DIN 67 530 at an angle of reflection of 60° C. (reflectometer value).

The results are summarised in Table 1.

Example 2

Example 1 is repeated, wherein in stage B 158.30 g of the polybutadiene latex from stage A and a total of 16.18 g of a t-dodecylmercaptan/n-dodecylmercaptan=1:1 mixture is used. A polybutadiene latex with an average particle diameter $d_{50}$ of 298 nm and a gel content of 42 wt. % is produced after stage B.

Stage C is performed in the way described in example 1, wherein 83.20 parts by wt. of 48.1 wt. % strength polybutadiene latex (Δ40 parts by wt of polybutadiene) and 60 parts by wt. of the monomer/regulator mixture described are used.

In stage D, the same procedure is used as is described in example 1, wherein 55 parts by wt. of the resulting graft rubber powder is mixed with 45 parts by wt. of the styrene/acrylonitrile copolymer resin.

Example 3

Example 2 is repeated, wherein stages A and B are the same but in stage C addition of the monomer/regulator mixture is performed in such a way that 80 wt. % of the total amount of monomers is added to the reaction mixture within the first 2 hours. Stage D is performed in the way as described in example 2.

Example 4 (Comparison)

Example 2 is repeated, wherein in stage B 332.76 g of the polybutadiene latex from example 1/stage A are used as seed latex. A polybutadiene latex with an average particle diameter $d_{50}$ of 205 nm and a gel content of 65 wt. % is obtained, which is used in a graft polymerisation as described in example 2 and is tested as a graft rubber powder when mixed in the same way with a styrene/acrylonitrile copolymer resin.

Example 5 (Comparison)

Example 2 is repeated, wherein in stage B 155.40 g of a 40 wt. % strength polybutadiene latex with an average particle diameter $d_{50}$=112 nm and a gel content of 41 wt. % is used as the seed latex.

A polybutadiene latex with an average particle diameter $d_{50}$ of 281 nm and a gel content of 46 wt. % is produced and this is subjected to stages C and D as described in example 2.

Example 6 (Comparison)

Example 2 is repeated, wherein in stage B 100.20 g of the polybutadiene latex from example 1/stage A is used as the seed latex.

A polybutadiene latex with an average particle diameter $d_{50}$ of 338 nm and a gel content of 60 wt. % is obtained and this is subjected to stages C and D as described in example 2.

Example 7 (Comparison)

Example 2 is repeated, wherein in stage B a total of 9.7 g of a t-dodecylmercaptan/n-dodecylmercaptan=1:1 mixture is used and the polymerisation reaction is terminated after the pressure drops to 3 bar.

A polybutadiene latex with an average particle diameter $d_{50}$ of 281 nm and a gel content of 78 wt. % is obtained and this is subjected to stages C and D as described in example 2.

Example 8 (Comparison)

Example 2 is repeated, wherein in stage C addition of the styrene/acrylonitrile/regulator mixture is performed in such a way that 50 wt. % of the total amount is added to the reaction mixture within the first 2 hours and the remaining 50 wt. % is added within the last 2 hours. The resulting graft rubber powder is subjected to stage D as described in example 2.

Example 9 (Comparison)

Example 2 is repeated, Wherein in stage C addition of the styrene/acrylonitrile/regulator mixture is performed in such a way that 30 wt. % of the total amount is added to the reaction mixture within the first 2 hours and the remaining 70 wt. % is added within the last 2 hours. The resulting graft rubber powder is subjected to stage D as described in example 2.

The test results summarised in Table 1 clearly show that only the moulding compounds according to the invention have a combination of very high strength and very high gloss. It is important that the values for the other technologically important ABS properties, such as hardness, heat resistance and in particular thermoplastic flow characteristics as a measure of processability are not adversely affected.

TABLE 1

Test data for the moulding compounds tested

| Example | $a_k^{RT}$ [kJ/m²] | $a_k^{-40°\,C.}$ [kJ/m²] | Hc [N/mm²] | Vicat B [°C.] | MVI [cm³/10 min] | Degree of gloss |
|---|---|---|---|---|---|---|
| 1 | 45 | 29 | 79 | 97 | 4.2 | 89 |
| 2 | 42 | 26 | 78 | 95 | 7.9 | 91 |
| 3 | 44 | 27 | 78 | 94 | 6.8 | 91 |
| 4 (comp.) | 10 | 3 | 70 | 92 | 12.8 | 90 |
| 5 (comp.) | 38 | 24 | 77 | 98 | 5.6 | 88 |
| 6 (comp.) | 35 | 22 | 80 | 98 | 5.7 | 74 |
| 7 (comp.) | 25 | 19 | 89 | 96 | 8.4 | 87 |
| 8 (comp.) | 34 | 23 | 76 | 96 | 7.5 | 87 |
| 9 (comp.) | 29 | 17 | 77 | 97 | 8.8 | 85 |

We claim:
1. Thermoplastic moulding compounds obtained by

A) producing a rubber latex with an average particle diameter $d_{50}$ of 30 to 160 nm and a gel content of 75 to 100 weight % by emulsion polymerization of butadiene and optionally up to 50 weight %, with reference to the total amount of monomer in stage A, of a comonomer;

B) emulsion polymerization of an amount of butadiene and optionally up to 50 weight %, with reference to the total amount of monomer in stage B, of a comonomer in the presence of the rubber latex obtained in stage A, such that a rubber latex (B) with an average particle diameter $d_{50}$=220 to 330 nm and a gel content of 25 to 70 weight % is produced;

C) emulsion polymerization of 40 to 95 parts by weight of a mixture of styrene and acrylonitrile, which optionally contains up to 50 weight %, with reference to the total amount of monomers used in stage C, of one or more comonomers, in the presence of 5 to 60 parts by weight, with reference to the solids, of the rubber obtained in stage B by introducing the monomer in such a way that 55 to 90 weight % of the monomers are added within the first half of the total monomer introduction time; and D) mixing the polymer obtained in stage C, with at least one thermoplastic vinyl resin.

2. A thermoplastic moulding compound as claimed in claim 1, wherein:

A) the rubber latex particles have an average particle diameter $d_{50}$ of 50 to 150 nm and a gel content of 80 to 95 weight %;

B) the emulsion polymer (B) has an average particle diameter $d_{50}$=230 to 320 nm and a gel content of 30 to 65 weight %; and C) the emulsion polymer (C) consisting of 50 to 90 parts by weight of a mixture of styrene and acrylonitrile, which optionally contains up to 50 weight %, with reference to the total amount of monomers used in stage C, of one or more comonomers, in the presence of 10 to 50 parts by weight, with reference to the solids, of rubber, was obtained in such a way that between 60 and 80 weight % of the total amount of monomers being used for reaction in stage C is added within the first half of the total monomer addition time.

3. A thermoplastic molding composition as claimed in claim 1, wherein the polymer obtained in stage C) is converted into a powder prior to mixing with said at least one thermoplastic vinyl resin.

4. A thermoplastic molding composition as claimed in claim 2, wherein the polymer obtained in stage C) is converted into a powder prior to mixing with said at least one thermoplastic vinyl resin.

5. A thermoplastic molding composition as claimed in claim 1, wherein the thermoplastic vinyl resin is a styrene/acrylonitrile copolymer.

* * * * *